United States Patent [19]
Elerath

[11] 3,961,424
[45] June 8, 1976

[54] PROCESS FOR FREEZING COFFEE EXTRACT PRIOR TO LYOPHILIZATION
[75] Inventor: Byron E. Elerath, Mountain Lakes, N.J.
[73] Assignee: General Foods Corporation, White Plains, N.Y.
[22] Filed: Aug. 28, 1975
[21] Appl. No.: 608,417

[52] U.S. Cl. .......................................... 34/5; 34/92
[51] Int. Cl.² ............................................ F26B 5/06
[58] Field of Search ................................... 34/5, 92

[56] References Cited
UNITED STATES PATENTS

| | | | |
|---|---|---|---|
| 3,373,042 | 3/1968 | Elerath et al. | 34/5 |
| 3,399,061 | 8/1968 | Lutz | 34/5 |
| 3,438,784 | 4/1969 | Clinton et al. | 34/5 |
| 3,443,962 | 5/1969 | Elerath | 34/5 |
| 3,888,859 | 6/1975 | Ponzoni et al. | 34/5 |
| 3,925,903 | 12/1975 | Ward | 34/5 |

Primary Examiner—John J. Camby
Attorney, Agent, or Firm—Richard Kornutik; Bruno P. Struzzi; Daniel J. Donovan

[57] ABSTRACT

This invention involves dispersing coffee extract in relatively warm immiscible liquid refrigerant wherein the temperature of the extract/refrigerant mix is maintained at about 15°F. to the ice point of the extract. This permits the formation of large ice crystals whereby the finished product is darker and more coffee-like in color. Next the temperature of the mix is reduced to below −20°F. and the frozen extract is separated from the refrigerant and is then freeze-dried.

11 Claims, No Drawings

PROCESS FOR FREEZING COFFEE EXTRACT PRIOR TO LYOPHILIZATION

BACKGROUND OF THE INVENTION

The growing demand for freeze-dried products has led to ever increasing demands for more efficient means of performing all the operations necessary to obtain a freeze-dried product. A critical step in the process is the actual freezing of the product to be dried. Generally it is recognized that rapid freezing will promote the growth of a large number of well ordered dendritic ice crystals of small size and that slow freezing will produce a lesser number of ice crystals of a larger size. Thus, in the dehydration of solid foods, the cellular structure of the food can be modified by varying the freezing rate. Since liquid food materials such as coffee extract lacks the cellular structure of solid foods, various methods have been advanced to promote the formation of large crystals during the freezing process of the extract. A large ice crystal structure when sublimed permits a product which is darker and more coffeelike in color than a product based on the smaller ice crystal structures.

The freezing of coffee extract in preparation for freeze-drying is commonly done on a continuous stainless steel or Teflon coated belt. Liquid, slushed and/or foamed extract is normally fed onto one end of the belt by a pipe or spreader device. Freezing or heat removal is by conduction through the belt such as by continually spraying the underside of the belt freezing surface with brine. Agitation or vibration of the extract may be used to prevent supercooling and spontaneous nucleation and also to make heat removal from the extract more uniform. More commonly, static freezing is employed in which no overt agitation of the extract is used, and the liquid material is slowly frozen by contact with the cooled belt surface. Still another method is to seed the extract with previously formed ice crystals. These methods, however, have inherent disadvantages or limitations. Specifically agitation is only feasible during the early stages of chill-down while the extract is still liquid. Likewise seeding techniques can only be performed while the extract is still in a liquid state.

The freezing rate for coffee extract is a major factor in the final product's color. A high freezing rate produces a product which is light brown or tan in color. As the freezing rate is slowed, a darker, more desirable product is obtained. It has been found, as discloseed in U.S. Pat. No. 3,399,061 to Lutz, that final product color of freeze-dried coffee may be controlled by adjusting the freezing rate of the extract. The most critical portion of the freezing step is the initial period wherein proper ice crystal growth is initiated. The methods of freezing coffee extract employed by the prior art do not permit substantially all the extract to be maintained at a critical temperature for a period of time. Typically a bed of coffee extract ¼ to 1 inches thick on a freezing surface will have a multiplicity of temperature zones throughout the bed. Additional hold-up time is necessary for substantially all of the extract to equilibrate at a particular temperature using the methods disclosed in the prior art.

Another disadvantage of the prior processes is that when the freezing steps are completed, the coffee extract exists in the form of a frozen slab. Since the desired finished product is granular in form, the extract must be subdivided prior to or after freeze-drying. Subdivision of extract is normally accomplished prior to freeze-drying. Typically, the frozen slab is fed into a mill with a series of rotating blades. On the discharge side of the mill is a screen whose hole size permits only the passage of particles when they are sufficiently reduced in size by the rotating blades. Oversized particles are effectively limited by the screen itself since they will not pass through the selected screen size opening. Unfortunately, undersized particles, including very fine material which is generated by the milling process itself, easily passes through the screen. To remove these undersized particles from the product requires additional processing steps.

It would, therefore, be highly desirable if a simple method were devised for freezing coffee extract which produces a finished product which is dark and coffee-like in color. It is also desirable to eliminate the grinding and fines removal processing steps of conventional freeze-dried coffee processing.

As used in this application "extract" means an aqueous extract of coffee solids having a concentration of between 15% and 50% soluble solids by weight. "Ice point" is that temperature at which water in the extract begins to crystallize into water ice. "Eutectic point" means that temperature at which the specific mixture of coffee solids volatile aromatics and water having the lowest melting point of any other mixture in the extract solidifies. In effect, this temperature is the lowest possible melting point of any material contained in the extract. "Product temperature" as used herein means the temperature of the dried coffee extract. "Freeze drying or lyophilization" as used in this context refers to the process of drying whereby water is removed directly from the solid state to the vapor state without passing through an intermediate liquid state (sublimation). This process also includes that portion of the drying process wherein all the water ice crystals have been sublimed and an eutectic mixture of coffee solids aromatics and water is dried to a stable moisture content. In this portion of the freeze-drying process it is possible that some evaporation of water from the liquid state may occur without appreciable melting of the frozen extract. However, even at this stage of the drying, the product temperature should be kept below the eutectic point of the material dried in order to avoid melting any portion of the frozen extract.

SUMMARY OF THE INVENTION

This invention is directed to a process in which coffee extract is dispersed in relatively warm immiscible refrigerant wherein the temperature of the extract/refrigerant mix is maintained at about 15°F. to the ice point of the extract. As the extract is introduced into the refrigerant, small droplets of extract are formed within the refrigerant. The temperature of the mix is maintained at the critical temperature for ice crystal growth (about 24°F. to about 28°F.) for at least 4 minutes. Next the temperature of the mix is reduced to below −20°F. and the frozen extract granules are then separated from the liquid refrigerant. Next the granules are freeze-dried.

DETAILED DESCRIPTION OF THE INVENTION

According to the process of this invention, a coffee extract is first obtained. Preferably the extract is held at a temperature of about 32°F. The extract is then introduced to an immiscible liquid refrigerant. The temperature of the refrigerant is maintained such that the product temperature is held at about 24°F. to about 28°F. for at least 4 minutes and preferably more than 8 minutes. This is to permit the growth of large ice crystals. By suitable adjustment of pumping parameters small droplets of extract can be formed in the refrigerant by such means as pumping the extract through a small, say less ¼ inch inside diameter, bore tube into the refrigerant. Another method contemplated by the process of this invention is mixing the extract in a venturi device with the refrigerant in the high velocity zone and the extract entering the low pressure zone. The output of the venturi is an extract/refrigerant mix in which the extract is highly dispersed in the refrigerant in droplet form.

Another method of freezing the product according to the process of this invention is to pump an extract/refrigerant mix through a tubular heat exchanger. Another method of controlling the temperature is by passing the extract/refrigerant through progressively lower pressure zones causing the refrigerant to evaporate and the temperature to drop to the desired level. The evaporated refrigerant would be recovered. Still another embodiment of this invention makes use of a tall column with internal baffles. At the bottom a circulating pump would eject product into the refrigerant by a venturi. The product having a lower density would move upwards encountering baffles to restrict speed to zones of lower pressure, lower due to static head. A compressor would be connected to the top of the column to maintain final pressure-temperature at that desired for the product. Thus a temperature gradient would become established in the refrigerant column by virtue of the pressure differential between the top and the bottom of the column. In any of the above freezing methods, once the product has remained at the critical temperature for ice crystal growth for a sufficient amount of time, it may then be brought down to a temperature below the eutectic point of the coffee extract which is about −13.5°F.

The frozen product now exists within the liquid refrigerant as frozen granules. A particular advantage of this invention is that these granules can be relatively uniform in size. One skilled in the art will be able to obtain particles of various sizes utilizing the teachings of this invention. An additional advantage is that a product can be produced without the presence of undersized particles. Thus the additional steps and expense of removing the fine particles generated by conventional processes are eliminated. The product is next separated from the refrigerant by suitable means such as screening and is then conventionally freeze-dried. The liquid refrigerant may be recycled. It is contemplated that the methods of this invention may be practiced in either a batch or a continuous type process.

It will be appreciated that this invention permits sustantially all of the coffee extract to be maintained at a particular temperature for a period of time. The ratio of extract to refrigerant can be between about 1:5 and about 1:50 and preferably about 1:10. Since the extract exists within the liquid refrigerant as droplets, the relationship of the surface area of the extract droplet to the refrigerant permits the product temperature to equilibrate with the refrigerant temperature almost instantaneously. Thus, substantially all of the coffee extract may be controlled at a desired temperature.

This invention is further described but not limited by the following example:

50 ml. of 35% concentration coffee extract is placed in a 500 ml. beaker and 200 ml. of R21 ($CHCl_2F$, B.P. 47°F.) is added. A stirrer is used to disperse the extract into small globs. Dry ice is used to reduce and maintain the temperature of the extract/refrigerant mix to between 24°F. and 28°F. for four minutes. Then the temperature of the extract/refrigerant mix is reduced to below −20°F. The extract, now frozen and granular in form, is removed by pouring the mixture through a screen after first removing the remaining dry ice. The frozen extract is then freeze dried in a small stokes laboratory freeze dryer, keeping the pressure less than 200 $\mu$ of Hg. The resultant product is dark brown and coffee-like in color.

What is claimed is:

1. A process for producing a dark colored freeze-dried coffee which comprises:
   a. producing a liquid coffee extract,
   b. mixing the coffee extract in a liquid refrigerant wherein the liquid refrigerant is maintained at a temperature between about 15°F. to the ice point,
   c. allowing the coffee extract to reach temperature equilibration with the refrigerant of step (b) and remain so for at least 4 minutes in order to permit the growth of large ice crystal structures, and thereafter,
   d. cooling the coffee extract/liquid refrigerant mix to a temperature below the eutectic point of the coffee extract,
   e. separating the frozen coffee extract from the liquid refrigerant, and
   f. freeze drying the frozen coffee extract.

2. The method of claim 1 wherein the coffee extract is immiscible in the liquid refrigerant.

3. The method of claim 2 wherein the ratio of extract to refrigerant is between about 1:5 and about 1:50.

4. The method of claim 3 where the extract is pumped into the liquid refrigerant by means of a small bore tube.

5. The method of claim 3 wherein a venturi device with the refrigerant in the high velocity zone and the extract in the low pressure zone is used as the mixing means.

6. The method of claim 3 wherein the liquid refrigerant of step (b) is maintained at a temperature between about 24°F. to about 28°F.

7. The method of claim 4 wherein the liquid refrigerant of step (b) is maintained at a temperature between about 24°F. to about 28°F.

8. The method of claim 5 wherein the liquid refrigerant of step (b) is maintained at a temperature between about 24°F. to about 28°F.

9. The method of claim 3 wherein the coffee extract is allowed to reach temperature equilibration with the refrigerant and remain so for at least 8 minutes before cooling the coffee extract/liquid refrigerant mix to a temperature below the eutectic point of the coffee extract.

10. The method of claim 4 wherein the coffee extract is allowed to reach temperature equilibration with the refrigerant and remain so for at least 8 minutes before cooling the coffee extract/liquid refrigerant mix to a temperature below the eutectic point of the coffee extract.

11. The method of claim 5 wherein the coffee extract is allowed to reach temperature equilibration with the refrigerant and remain so for at least 8 minutes before cooling the coffee extract/liquid refrigerant mix to a temperature below the eutectic point of the coffee extract.

* * * * *